US007059010B2

(12) United States Patent
Heneghan

(10) Patent No.: US 7,059,010 B2
(45) Date of Patent: Jun. 13, 2006

(54) MINI BLIND CLEANING SUPPORT SYSTEM

(76) Inventor: Karen Heneghan, 466 Dee La., Roselle, IL (US) 60172

( * ) Notice: Subject to any disclaimer, the term of this patent is extended or adjusted under 35 U.S.C. 154(b) by 730 days.

(21) Appl. No.: 10/037,020

(22) Filed: Dec. 21, 2001

(65) Prior Publication Data

US 2002/0088076 A1 Jul. 11, 2002

Related U.S. Application Data

(60) Provisional application No. 60/260,303, filed on Jan. 8, 2001.

(51) Int. Cl.
*A47L 13/54* (2006.01)
*F16B 47/00* (2006.01)

(52) U.S. Cl. .................. 15/268; 248/205.5; 248/206.2; 248/206.3; 248/206.4

(58) Field of Classification Search .................. 15/268; 248/201, 205.5, 206.2, 206.3, 206.4
See application file for complete search history.

(56) References Cited

U.S. PATENT DOCUMENTS

| | | | | |
|---|---|---|---|---|
| 1,523,042 | A | 1/1925 | Thomas | |
| 2,849,745 | A * | 9/1958 | Madsen | 15/268 |
| 2,890,851 | A * | 6/1959 | Anderle | 248/201 |
| 4,376,521 | A * | 3/1983 | Walters | 248/206.3 |
| 4,934,015 | A | 6/1990 | Mink | 15/268 |
| 4,951,909 | A | 8/1990 | Russo | 248/206.2 |
| 5,096,272 | A * | 3/1992 | Belokin et al. | 312/129 |
| 5,655,589 | A * | 8/1997 | Vartanian | 160/166.1 |
| D391,706 | S | 3/1998 | Malcolm | D32/35 |
| 6,016,926 | A * | 1/2000 | Smith et al. | 211/119.011 |
| 6,308,923 | B1 * | 10/2001 | Howard | 248/205.5 |
| 6,325,344 | B1 * | 12/2001 | Gary et al. | 248/206.3 |

* cited by examiner

*Primary Examiner*—Gladys J P Corcoran
*Assistant Examiner*—Laura C Guidotti
(74) *Attorney, Agent, or Firm*—Nicholas A. Camasto

(57) ABSTRACT

A support system for cleaning mini blinds includes a pair of end supports and an intermediate support, each support having a back portion and a lower portion extending at right angles for supporting the spine of the mini blind. A pair of suction cups is affixed to each back portion for securing the back portion to a smooth surface. An alignment indicia is provided on the back portions for aiding in horizontal alignment of the supports. The two end supports each include a side portion and a front portion for restricting movement of the spine of the supported mini blind.

7 Claims, 3 Drawing Sheets

Fig. 3
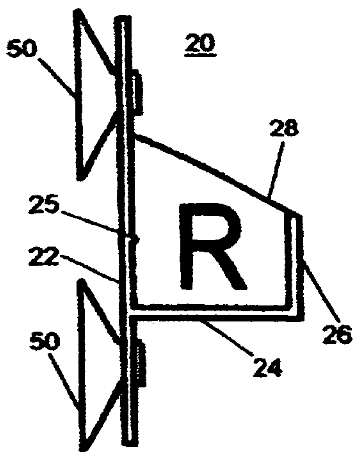
Fig. 2
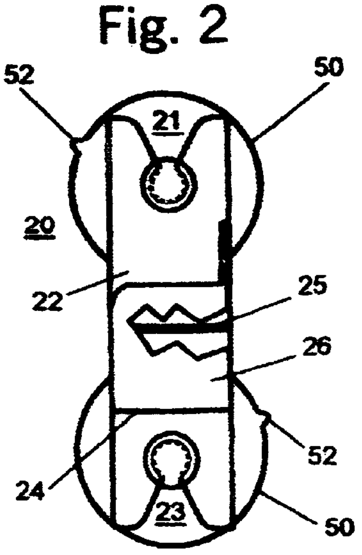
Fig. 4
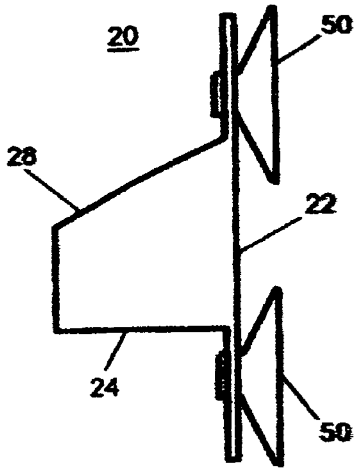
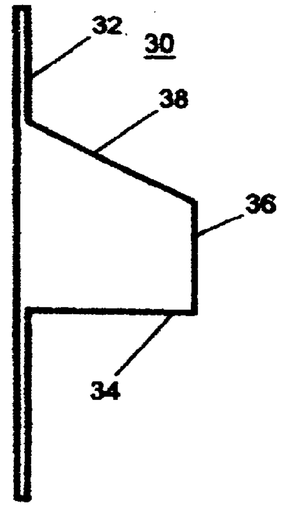
Fig. 6
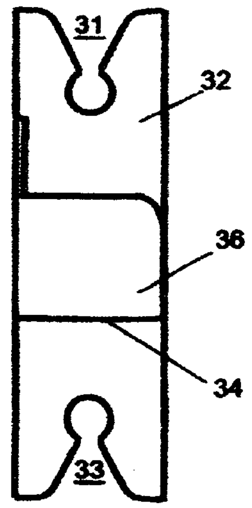
Fig. 5
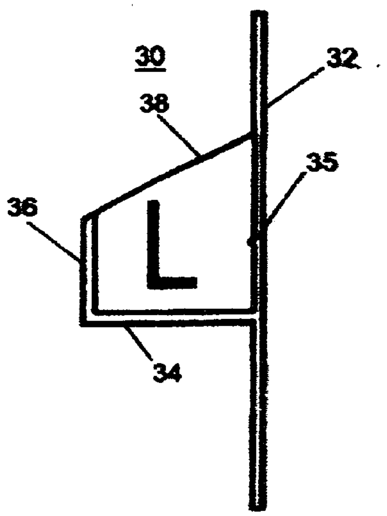
Fig. 7

Fig. 8
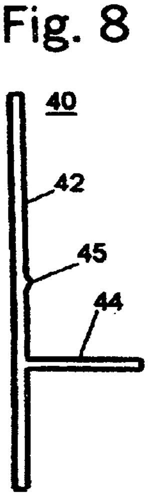
Fig. 9
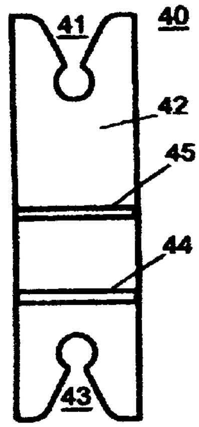
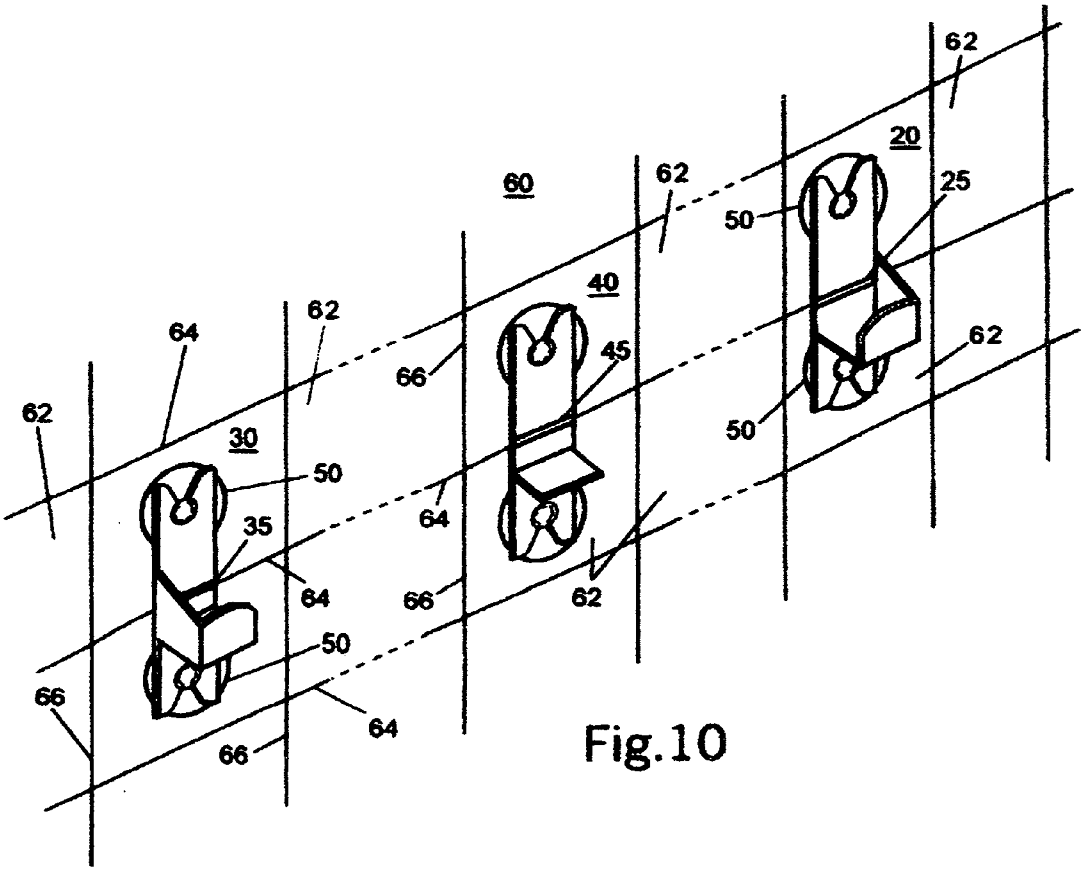
Fig.10

MINI BLIND CLEANING SUPPORT SYSTEM

CROSS REFERENCE TO RELATED APPLICATION

This application claims the benefit of the inventor's Provisional Application No. 60/260,303, filed Jan. 8, 2001.

BACKGROUND OF THE INVENTION

This invention relates generally to mini blind cleaning and particularly to a support system that enables a mini blind to be temporarily supported in an area where it may be subjected to a thorough cleaning, including the use of soap and water, without mess.

Mini blinds of all varieties are in common usage today as window coverings. As is well known, a mini blind consists of a rigid spline from which a plurality of horizontally disposed slats is supported for limited rotational movement to provide a desired shade effect. It should be noted that the term "mini blind" as used herein is intended to encompass all types of Venetian blinds which include a plurality of parallel light blocking slats that are movable in unison. The slats of the mini blind may also be conventionally raised or lowered in a progressive manner. For example, the slats may be fully raised for ease of installation and removal of the mini blind.

Mini blinds of all varieties are in common usage today as window coverings. As is well known, a mini blind consists of a rigid spine from which a plurality of horizontally disposed slats is supported for limited rotational movement to provide a desired shade effect. It should be noted that the term "mini blind" as used herein is intended to encompass all types of Venetian blinds which include a plurality of parallel light blocking slats that are movable in unison. The slats of the mini blind may also be conventionally raised or lowered in a progressive manner. For example, the slats may be fully raised for ease of installation and removal of the mini blind.

OBJECTS OF THE INVENTION

A principal object of the invention is to provide an improved cleaning system for mini blinds;

Another object of the invention is to provide a temporary support system for facilitating the thorough cleaning of mini blinds.

SUMMARY OF THE INVENTION

In accordance with the invention, a plurality of suction mounted supports is provided for supporting the spine of a mini blind in an environment, such as over a bathtub or in a shower stall, that permits wet cleaning thereof. The inventive structure includes a pair of end supports, each including a bottom, a side and a front portion, for restricting movement of the supported spine during cleaning.

BRIEF DESCRIPTION OF THE DRAWINGS

Other objects and advantages of the invention will be apparent upon reading the following description in conjunction with the drawings in which:

FIGS. 2, 3 and 4 are front, right and left side elevations of the right end support of the invention, respectively;

FIGS. 5, 6 and 7 are corresponding elevations of the left end support;

FIGS. 8 and 9 are a front and left side elevation of the intermediate support of the invention; and FIG. 10 is a partial perspective view of the support system mounted on a tiled wall in position to receive a mini blind for cleaning.

DETAILED DESCRIPTION OF THE INVENTION

Figure 1:
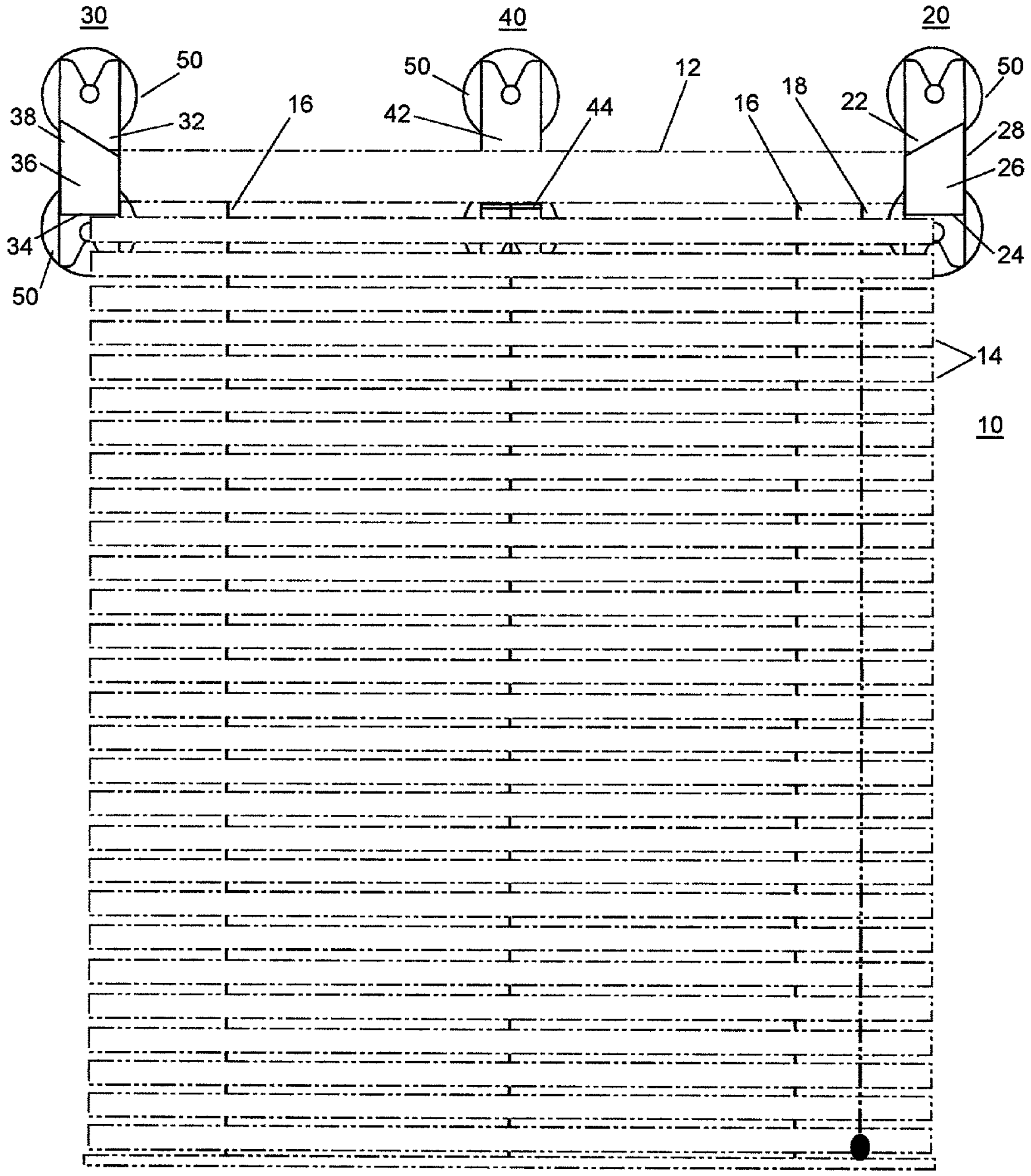
FIG. 1 shows the support system of the invention supporting a mini blind for cleaning.

Referring to FIG. 1, a mini blind 10 is shown (in simplified form and not to scale) supported for cleaning by the support system of the invention. Mini blind 10 includes a horizontally disposed rigid spine 12 and a plurality of slats 14 supported from spine 12 by three support tapes 16. The tapes, which are simply depicted by lines are well known and function to support the slats for limited rotational movement, in unison, in response to operation of a control lever or other suitable device (not shown). Movement of support tapes 16 rotates the slats 14 to control the amount of light admitted by the mini blind. A draw cord 18 controls the progressive raising and lowering of the slats of the mini blind, all in a well known manner.

Spine 12 is supported at its ends by a right end support 20 and a left end support 30 and at its middle by an intermediate support 40. The supports are in turn secured to a flat; preferably vertical, wall or surface by means of suction cups 50. Further reference to FIGS. 3 through 9 may be-made for the following description of supports 20, 30 and 40. Right end support 20, left end support 30 and intermediate support 40 each include a back portion 22, 32 and 42, respectively, and a bottom portion 24, 34 and 44, respectively. The back portions define a pair of V-shaped keyholes 21,23, 31,33 and 41,43, respectively, in which suction cups 50 are secured. Each of the bottom portions 24, 34 and 44 extends at right angles from its respective back portion. The right and left end supports 20 and 30 also include side portions 28 and 38, respectively, and front portions 26 and 36, respectively, that define open sided enclosures for loosely captivating the ends of the spine of mini blind 10, with the front and side portions restricting longitudinal and transverse longitudinal movement of the spine. The suction cups 50 are conventional and include lifting tabs 52 for readily releasing them from the wall or surface by breaking the suction seal that secures them. As is best seen in the partially broken away front wall 26 of right end support 20 of FIG. 2 and in FIG. 8, indicia 25, 35 and 45 are molded into the back supports for assisting in aligning the supports on a tiled wall having horizontally disposed grout lines. The supports are preferably molded of plastic material.

FIG. 10 shows a portion of a shower stall or bath wall 60 having smooth surface tiles 62 that are arranged in a pattern defined by horizontally disposed grout lines 64 and vertically disposed grout lines 66. Right end support 20, left end support 30 and intermediate support 40 are positioned with their respective suction cups on associated ones of tiles 62 with the back supports being vertically aligned with the vertical grout lines 66 and horizontally aligned by means of indicia 25, 35 and 45, respectively, with the horizontal grout lines 64. The spacing between the end supports 20 and 30 is determined by the length of the spine 12 of the mini blind, and the intermediate support is positioned to coincide with the middle of the spine. When so positioned, the mini blind may be readily and securely hung by the supports 20, 30 and 40 and manipulated as necessary for thorough cleaning. Thorough cleaning with soap and water or other suitable liquid cleaner may thus be carried out in the shower/bath environment. It will of course be appreciated that cleaning of the mini blind may also be performed by using the support system on any smooth surface, for example an outdoor patio door or large window.

It will be appreciated by those skilled in the art that the physical size of the supports is not critical to the invention and the following dimensions are for reference purposes only. In the preferred embodiment, the back portions are 3¾"×1⅛", the bottom portions extend outwardly 1¾" and the front portions are 1" high. The suction cups are 1¾" in diameter. The thickness of the supports is 3⁄32".

What has been described is a novel support system for facilitating the cleaning of a mini blind. It is recognized that numerous changes to the described embodiment of the invention will be apparent without departing from its true spirit and scope. The invention is to be limited only as defined in the claims.

The invention claimed is:

1. A mini blind cleaning system comprising:

a mini blind having a rigid spine;

a first and a second end support and an intermediate support;

said first and said second end support and said intermediate support each including a back portion and a lower portion extending at substantially right angles thereto; and suction cup means affixed to said back portions for securing said first and said second end support and said intermediate support to a smooth, flat surface with said lower portions in a horizontal attitude for supporting opposite ends and an intermediate portion of said spine.

2. The system of claim 1, wherein said end supports include side portions for restricting longitudinal horizontal movement of said spine.

3. The system of claim 1, wherein said end supports include front portions for restricting transverse horizontal movement of said spine.

4. The system of claim 1, wherein said suction cup means comprises a pair of suction cups.

5. The system of claim 1, further including horizontal alignment indicia in each of said end portions and said intermediate portion.

6. A mini blind cleaning system comprising:

a mini blind having a rigid spine;

a first and a second end support and an intermediate support;

said first and said second end support each including a back portion, a lower portion extending at substantially right angles thereto and a side portion for restricting longitudinal horizontal movement of said spine;

said intermediate support also including a back portion and a flat lower portion extending at a substantially right angle thereto; and a pair of suction cups affixed to each of said back portions for securing said end supports and said intermediate support to a smooth, flat surface with said lower portions in a horizontal attitude for supporting said spine.

7. The system of claim 6, further including horizontal alignment indicia in each of said end portions and said intermediate portion.

* * * * *